United States Patent [19]

Camerik

[11] 3,746,347

[45] July 17, 1973

[54] STYLUS-SECURING-DEVICE

[75] Inventor: Eduard Camerik, Emmasingel, Eindhoven, Netherlands

[73] Assignee: U.S. Philips Corporation, New York, N.Y.

[22] Filed: Apr. 21, 1971

[21] Appl. No.: 136,077

[30] Foreign Application Priority Data

Apr. 30, 1970 Netherlands ........................ 7006414

[52] U.S. Cl. .................................................. 274/37

[51] Int. Cl. ............................................ G11b 3/02

[58] Field of Search ....................................... 274/37

[56] References Cited

UNITED STATES PATENTS 3,334,904 8/1967 Haines ................................ 274/37

*Primary Examiner*—Louis R. Prince

*Assistant Examiner*—Charles E. Phillips

*Attorney*—Frank R. Trifari

[57] ABSTRACT

A device for detachably securing a stylus cartridge, which is provided with plugs, in a tone arm of a record player. The device comprises a plate-shaped slide which is adapted to be inserted into the head part of the arm and is provided with electrically conducting contact strips which, in the inserted condition of the slide, are in contact with electrically conducting strips provided in the head part of the arm. The slide has a rear wall part in which apertures have been formed which constitute sockets for the plugs of the stylus cartridge and in which parts of the contact strips of the slide extend so as to form contact members for the plugs, permitting the stylus cartridge to be mechanically and electrically connected to the slide by a single insertion operation.

3 Claims, 4 Drawing Figures

Figure 1:
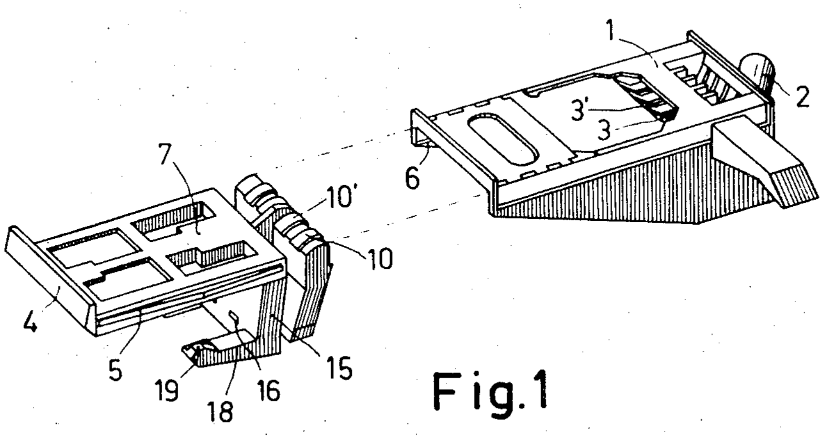

INVENTOR.
EDUARD CAMERIK
BY
Frank R. Trifari
AGENT

STYLUS-SECURING-DEVICE

The invention relates to a device for detachably securing a stylus cartridge provided with plugs in a tone arm of a record player, The device has a plate-shaped slide which is adapted to be inserted into a head part of the tone arm and is provided with electrically conductive contact strips which, in the inserted condition of the slide, are in contact with electrically conductive contact strips disposed in the head part of the arm, The stylus cartridge is adapted to be connected mechanically to the slide and electrically to the electrically conduct-ing strips of the slide.

In a known device of the said kind the stylus cartridge is mechanically coupled to the slide by means of two screws inserted in securing lugs arranged one to each side of the stylus cartridge. The electric connection of the stylus cartridge to the electrically conductive strips of the slide is established by means of a plurality of electrically conducting connecting wires each of which have at one end been soldered to the slide strips and at the other end are provided with sockets slipped onto the plugs of the stylus cartridge. In the known device the operation of establishing the mechanical and in particular the electrical connection between the stylus cartridge and the slide is comparatively laborious and inconvenient, especially when the user of the record player, who generally is no expert, wants to replace or to exchange a stylus cartridge and in doing so is faced with the problem of which ones of the sockets mounted on the connecting wire ends is to be slipped onto which of the plugs of the stylus cartridge.

It is an object of the invention to obviate the said disadvantages, This is achieved by providing a device according to the invention which comprises a plate-shaped slide having a rear wall part which extends substantially at right angles to the slide and having apertures formed in it which constitute sockets for the plugs of the stylus cartridge and in which parts of the contact strips of the slide extend so as to form contact members for the said plugs.

The invention enables the stylus cartridge to be mechanically and electrically coupled to the slide by a single insertion operation, the correct electrical connections being automatically established. In the device according to the invention the wires which hitherto have been commonly used to interconnect the slide and the stylus cartridge have been omitted and hence the need of soldering them is dispensed with.

The slide according to the invention preferably includes clamping members by means of which enable a stylus cartridge inserted into the sockets to be secured in position relative to the slide. This provides the advantages that the location and dimensioning of the sockets is not restricted within close manufacturing tolerances, which results in a low cost of the system, while the securing system is insensitive to shocks.

A preferred embodiment of the invention consists in that the slide includes two limbs which extend forward from the rear wall part, are arranged substantially parallel to the plate-shaped slide and are spaced apart from one another in a direction of width measured at right angles to the direction of insertion of the slide and the free ends of which are each provided with a collar part which extends towards the plate-shaped slide and is capable of engaging in one of two lugs provided at the side of the stylus cartridge and of clamping the cartridge to the slide.

Figure 2:
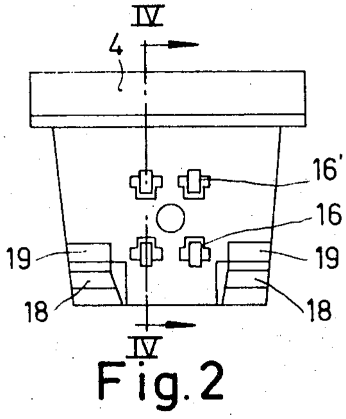
Figure 3:
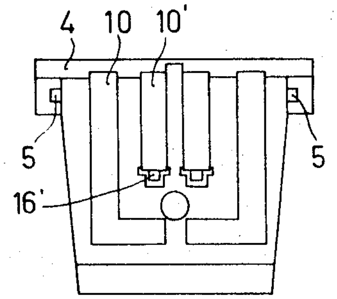
Figure 4:
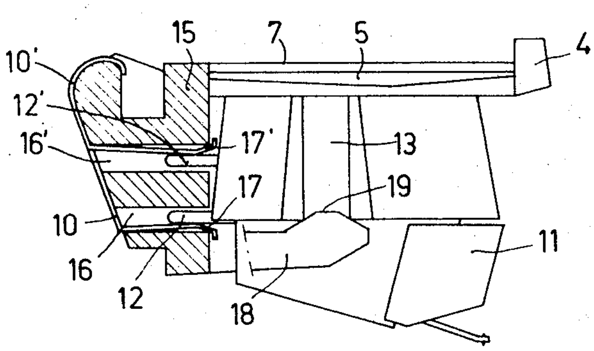

An embodiment of the invention will now be described, by way of example, with reference to the accompanying diagrammatic drawings, in which:

FIG. 1 is a perspective view of a head part of a tone arm of a record player and of a slide to be secured in the head part, FIG. 2 is an enlarged-scale front elevation of the slide of FIG. 1, FIG. 3 is an enlarged-scale rear elevation of the slide of FIG. 1, and FIG. 4 is a part longitudinal sectional view taken on the line IV—IV of FIG. 2, part side elevation of the slide with a stylus cartridge secured therein.

Referring now to FIG. 1, reference numeral 1 denotes a head part of a tone arm, not shown further, of a record player, which head part includes a tubular member 2 with which it may be slipped onto the tone arm in known manner. The head part further includes electrically conductive contact strips 3, 3', . . . in the form of leaf springs which may be connected in known manner to electrical connecting wires extending internally of the tone arm. At its upper surface the head part is covered and closed by a decorative plate, not shown.

Into the open front part of the head part 1 a slide 4 may be inserted, for which purpose the slide is provided with lateral guide ribs 5, which are guided in associated channels 6 of the head part. If desired, the head part and the slide may be provided with latch members permitting the slide when in its inserted condition to be locked to the head part. The slide is provided with electrically conducting contact strips 10, 10', . . . , which in the inserted condition of the slide are in contact with the contact strips 3, 3', . . . of the head part.

A stylus cartridge 11 of a known type is provided with plugs 12, 12', . . . which enable the electric connection to the contact strips 10, 10', . . . of the slide to be established, and further includes two lugs 13 disposed one on each side of the stylus cartridge and only one of which is shown in FIG. 4.

The slide 4 comprises a plate-shaped upper part 7 and a rear wall part 15, which extends substantially at right angles to the upper part and in which apertures 16, 16', . . . have been formed which constitute sockets capable of receiving the plugs 12, 12', . . . of the stylus cartridge 11. The ends 17, 17', . . . of the contact strips 10, 10' . . . of the slide extend in the apertures 16, 16' . . . in the rear wall part 15.

The slide 4 further comprises two limbs 18 which extend forward from the rear wall part 15 and are disposed substantially parallel to the upper part 7. The limbs 18 are spaced apart from one another in a width direction measured at right angles to the direction of insertion of the slide. The free ends of the limbs 18 have thickened portions which forms collars 19 which extend towards the plate-shaped upper part 7 of the slide and, as may be seen from FIG. 4, on insertion of the stylus cartridge into the sockets of the slide, snap into the lugs 13 of the cartridge so as to clamp it to the slide slightly resiliently and to secure it in position relative to the slide.

When the stylus cartridge is to be secured in a tone arm of a record player, first the stylus cartridge is inserted into the slide and clamped thereto in a single operation, after which the assembly of slide and cartridge is inserted into the head part of the tone arm. The invention provides a device which enables the stylus cartridge to be placed in position and, if desired, replaced or exchanged in a highly simple manner.

What is claimed is: contact strips 10, 10', . . . , which in the inserted condition of the slide are in contact with the contact strips 3, 3', . . . of the head part.

A stylus cartridge 11 of a known type is provided with plugs 12, 12', . . . which enable the ele

1. A device for detachably securing a stylus cartridge provided with plugs in a tone arm of a disc-record player, which device comprises a plate-shaped slide adapted to be inserted into a head part of the tone arm, electrically conducting contact strips provided on said slide, said strips being in contact with electrically conducting contact strips disposed in the head part of the arm when said slide is in the inserted condition, the stylus cartridge being adapted to be connected mechanically to the slide and electrically to the electrically conducting strips of the slide, a rear wall part on said plate-shaped slide extending substantially at right angles to the slide, and a plurality of apertures formed in said rear wall part forming sockets for the plugs of the stylus cartridge, a portion of the contact strips of the slide extending into said apertures so as to form contact members for the said plugs.

2. The device as claimed in claim 1, further comprising clamping members carried by said slide for securing a stylus cartridge inserted into the sockets in position relative to the slide.

3. The device as claimed in claim 2, further comprising two limbs carried by said slide extending forward from the rear wall part, said limbs being substantially parallel to the plate-shaped slide and spaced apart from one another in a direction of width measured at right angles to the direction of insertion of the slide, the free ends of each of said limbs being provided with a collar part extending towards the plate-shaped slide for engagement in one of two lugs provided at the side of the stylus cartridge so as to clamp the cartridge to the slide.

* * * * *